United States Patent
Panther et al.

(10) Patent No.: US 8,380,948 B2
(45) Date of Patent: Feb. 19, 2013

(54) MANAGING PURGEABLE MEMORY OBJECTS USING PURGE GROUPS

(75) Inventors: Heiko Gernot Albert Panther, San Francisco, CA (US); James Michael Magee, Orlando, FL (US); John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 815 days.

(21) Appl. No.: 12/204,775

(22) Filed: Sep. 4, 2008

(65) Prior Publication Data

US 2009/0063915 A1  Mar. 5, 2009

Related U.S. Application Data

(60) Provisional application No. 60/969,916, filed on Sep. 4, 2007.

(51) Int. Cl.
*G06F 12/00* (2006.01)
(52) U.S. Cl. ......... 711/159; 711/133; 711/134; 711/137
(58) Field of Classification Search ........................ None
See application file for complete search history.

(56) References Cited

U.S. PATENT DOCUMENTS

| | | |
|---|---|---|
| 6,757,808 B2 | 6/2004 | Iadonato et al. |
| 7,110,411 B2 | 9/2006 | Saidi et al. |
| 7,831,784 B2 | 11/2010 | Panther et al. |
| 2002/0178326 A1* | 11/2002 | Ohta et al. .................... 711/113 |
| 2006/0282542 A1* | 12/2006 | Pinckney et al. ............. 709/231 |
| 2008/0013450 A1 | 1/2008 | Worley et al. |

OTHER PUBLICATIONS

Semeria, Chuck, "Supporting Differentiated Service Classes: Queue Scheduling Disciplines", 2001, Juniper Networks, pp. 5-6.*

* cited by examiner

*Primary Examiner* — Kevin Verbrugge
*Assistant Examiner* — Stella Eun
(74) *Attorney, Agent, or Firm* — Fish & Richardson P.C.

(57) ABSTRACT

Memory objects associated with a portion of a cache (e.g., data blocks of a media file) are assigned a value based on their importance to an application that is consuming memory objects. The values are used to assign the data blocks to purge groups. The purge groups are a labeling mechanism for determining a purge order. A memory object associated with a first data block assigned to a first purge group may be purged before a memory object associated with a second data block assigned to a second purge group. As new data blocks are received by the application (e.g., from disk or a network connection), the blocks are assigned a value and added to a purge group. In some cases, the data blocks arrive out of order (e.g., order of consumption). Memory objects can be reassigned to a different purge group when new data blocks are added or reclaimed.

21 Claims, 7 Drawing Sheets

MANAGING PURGEABLE MEMORY OBJECTS USING PURGE GROUPS

RELATED APPLICATION

This application claims priority from U.S. Provisional Application No. 60/969,916, dated Sep. 4, 2007, entitled "Managing Purgeable Memory Objects Using Purge Groups" which provisional application is incorporated by reference herein in its entirety.

TECHNICAL FIELD

The subject matter of this application is related to memory management.

BACKGROUND

Purgeable memory objects are memory objects that can be purged so that physical memory associated with the memory objects can be freed for other purposes. Purgeable memory objects are used in some operating systems (e.g., Apple, Inc.'s Mac OS) for caching data that can be easily reconstructed, such as graphics or media files retrieved from a hard disk. Purgeable memory objects can be set to a volatile state. In a volatile state, the object can be emptied even when its contents are being used by another application, i.e., touched or "dirty." Volatile pages are often stored with other cache pages on a page queue which can include active and inactive queues having First In, First Out (FIFO) behavior. When a page of a memory object reaches the head of the FIFO page queue the memory object is destroyed.

The FIFO page queue is appropriate for purgeable memory objects having usage dates that are in the past. For other kinds of memory objects, like media streams, the FIFO behavior is not appropriate, since the usage dates for those memory objects are in the future.

SUMMARY

A system and method of managing purgeable memory objects includes a LIFO and/or FIFO queue for volatile memory objects, which can be emptied at a rate that matches the speed of a page queue.

In one general aspect, one or more tokens corresponding to portions of purgeable virtual memory of a memory system are generated. The memory system can be part of a computer operating system. The movement of the tokens through a data structure of the memory system is monitored. For example, monitoring the movement of the tokens includes inserting the tokens in a cache queue and determining if one or more tokens have reached the head of the cache queue. The movement of tokens determines movement speed of the cache queue. In some implementations, tokens are fictitious physical memory pages inserted in the cache queue. In some implementations, the data structure is a purgeable Last In, First Out (LIFO) queue. In some implementations, the cache queue is a First In, First Out (FIFO) queue.

Further, the expiration of the portions of purgeable virtual memory (e.g., purgeable virtual memory objects) based on the movement of the tokens is regulated. Regulating the expiration of the portions of purgeable virtual memory includes, for example, purging one or more portions of the purgeable virtual memory if there is a need for the memory system to reclaim physical memory and a token has reached a predetermined position in the cache queue.

In another general aspect, the memory system can generate tokens with associated counters which are operable to be incremented or decremented at a pace of physical memory being removed from a cache queue of a memory system. A count of a counter associated with a token designates a number of pages that have to be removed from a cache queue of the memory system before the token is ripe. The expiration of portions of purgeable virtual memory corresponding to the tokens based on counts of the counters can be regulated. For example, monitoring expiration includes purging one or more portions of the purgeable virtual memory if there is a need for the memory system to reclaim physical memory and a token counter has reached a predetermined count. The volatile memory objects can be added to a data structure, where each virtual memory object corresponds to a token in the token list. The data structure is logically linked with the token counters.

In another general aspect, the tokens are stored in a token queue, and each counter corresponding to a token in the token queue designates how many pages have to be removed from a cache queue of the memory system before the token reaches the head of the token queue. The memory system determines if a first counter reaches the head of the token queue and removes the first counter from the token queue if the counter reaches a predetermined position in the token queue (e.g., the head). A second counter is activated for the next token in the queue.

In another general aspect, the memory system creates a virtual memory object and adds the virtual memory object to a queue holding volatile objects. In addition, the memory system adds a fictitious page corresponding to the virtual memory object to a page cache queue of a memory system. Further, the memory system determines a need to reclaim physical memory and determine if a fictitious page has reached a head of the page cache queue. If, the need to reclaim physical memory and a fictitious page has reached the head of the page cache queue, the memory system purges a most eligible memory object from the queue holding volatile objects and purges the fictitious page from the page cache queue. In some implementations, the queue holding volatile objects is a Last In, First Out (LIFO) queue.

In another general aspect, the memory system creates a virtual memory object and adds the virtual memory object to a queue holding volatile objects. In addition, the memory system adds a token corresponding to the virtual memory object to a token queue of a memory system. A counter associated with the token is set. Further, the system determines a need to reclaim physical memory from the memory system and determines if a token at the head of the token queue is ripe. If there is a need to reclaim physical memory and the token is ripe, the system purges the most eligible memory object from the queue holding volatile objects and purges the token from the token queue. In some implementations, the queue holding volatile objects is a Last In, First Out (LIFO) queue. In some implementations, the queue holding volatile objects is a First In, First Out (FIFO) queue. Other implementations are disclosed that are directed to methods, systems, apparatuses and computer-readable mediums.

In another aspect, memory objects associated with a portion of a cache (e.g., data blocks of a media file) are assigned a value based on their importance to an application that is consuming memory objects. The values are used to assign the data blocks to purge groups. The purge groups are a labeling mechanism for determining a purge order (e.g., purge in reverse value order). For example, a memory object associated with a first data block assigned to a first purge group may be purged before a memory object associated with a second data block assigned to a second purge group. As new data blocks are received by the application (e.g., from disk or a network connection), the blocks are assigned a value and added to a purge group. In some cases, the data block arrive out of order (e.g., order of consumption). Memory objects can be reassigned to a different purge group when new data blocks are added or reclaimed.

In another aspect, a test data block is created and assigned a low value so as to be added to a purge group which is to be purged first in a reverse value order scheme. If a memory object associated with the test data block is purged as a consequence of a memory allocation decision then such information can be used to adjust the memory allocation scheme. For example, data blocks can be reassigned to different purge groups and/or the order of the data blocks within a given purge group can be modified.

DETAILED DESCRIPTION

Figure 1A:
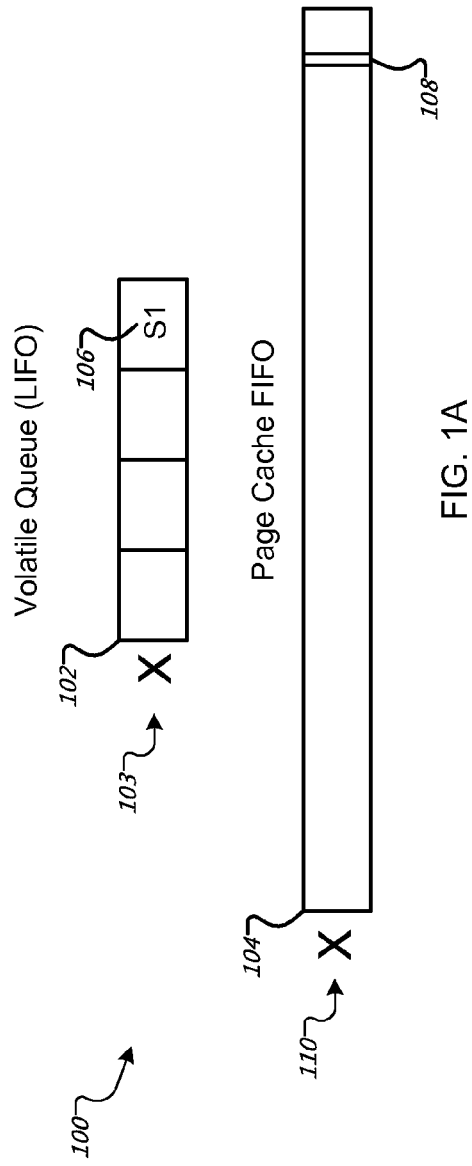
FIGS. 1A and 1B illustrate various data structures used for managing purgeable memory objects.
Figure 1B:
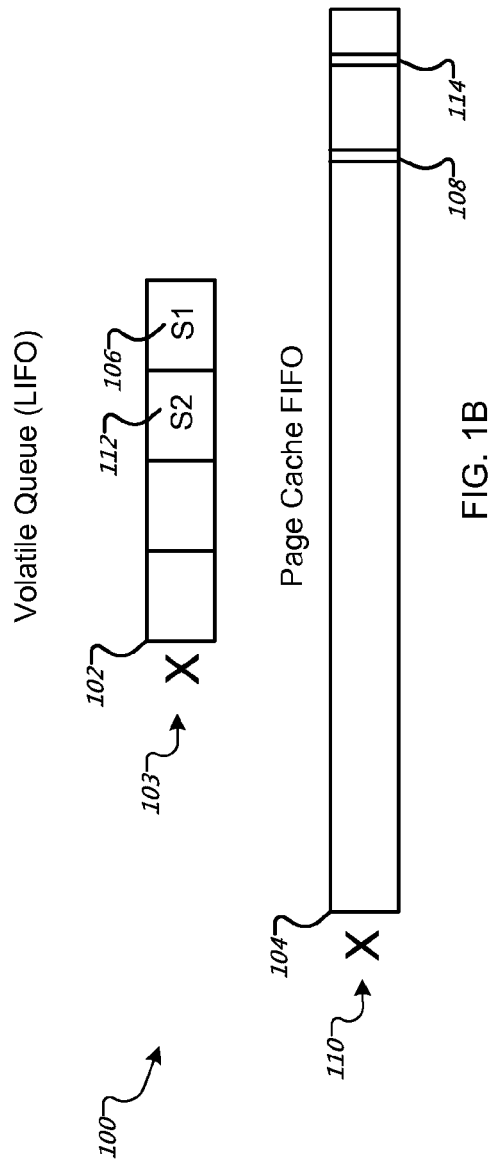

FIGS. 1A and 1B illustrate various data structures 100 used for managing purgeable virtual memory objects. Data structures 100 can generally store data in a computer (i.e., volatile or non-volatile memory) so that it can be used efficiently. The data can be in the form of memory pages that can be reclaimed, reactivated, or paged out. In some implementations, a data structure can include one or more queues, stacks, linked lists, trees, graphs, etc. Data structure 100 can, for example, include a queue 102 having one or more entities (e.g., memory objects) arranged in a particular order. Operations on the queue 102 can include the addition (construct) and removal (purge) of memory objects at the head or tail of the queue 102.

LIFO Queue Overview

FIG. 1A illustrates a Last In, First Out (LIFO) queue 102 that can store volatile memory objects 106. Memory object 106 can be of varying page sizes (e.g., 4K, 8K, 16K, etc.), any or all of which can be constructed for various purposes in the queue 102. Memory objects can be constructed of any number of pages and those pages can generally be managed by a memory management system. As is typical, the memory management system can construct, purge, move, swap, or otherwise manipulate memory objects within the data structures 100. In some implementations, the memory management system can be part of a computer operating system. The memory management system can accept requests from applications, for example, to allocate and de-allocate portions of memory. For example, the memory management system can construct memory object 106 for use in an application at a first time, and further, can purge the memory object 106 based on lack of use at a second future time or a memory shortage. In some implementations, volatile memory objects can be purged from queue 102 based on lack of use, request for use, memory shortage, or other system request, for example.

In some implementations, the memory object 106 can point to a physical memory location. In other implementations, the memory object 106 can point to a virtual memory location. In operation, new memory objects can be added at the head (purge point 103) of the queue 102. In a similar fashion, memory objects can be purged from the head. As such, in the LIFO queue 102, the newest added volatile memory object is generally purged first.

Page Cache FIFO Overview

FIG. 1A illustrates a page cache FIFO 104 that can also store objects. In particular, page cache 104 holds pages that mirror the hard disk of a computer system (virtual memory). As such, the objects can be retrieved from the virtual memory page cache 104 instead of the hard disk, thereby increasing memory transferring speeds. In one implementation, the objects stored in page cache FIFO 104 can be represented by fictitious memory pages 108. The fictitious memory page 108 can point to a volatile memory object in queue 102, for example. Thus, queue 102 can be coupled to page cache 104. Consequently, when a volatile memory object is added to the queue 102, a fictitious memory page can be added to page cache 104. While the volatile memory object 106 added to queue 102 can point to a physical memory location, the object 108 (e.g., the fictitious page) added to page cache 104 can point to the memory object 106.

In the page cache FIFO 104, new fictitious pages can be added to the tail. Further, fictitious pages can be reclaimed from the head (purge point 110) of cache 104. A fictitious page can be referred to as a "token." Tokens, in essence, are fictitious physical memory pages. In general, fictitious pages (tokens) do not point back to an actual physical page memory. Tokens can be generated by a memory management system and added to the page cache FIFO 104. As shown in FIG. 1A, a fictitious page 108 is added to page cache 104.

FIG. 1B illustrates the LIFO queue 102 and the page cache FIFO 104 with an additional memory object, 112 and an additional fictitious page 114. Additional memory objects can be added by the memory management system, for example, when an application requests memory usage. Here, the volatile memory object 112 has been added to queue 102 and fictitious page 114 has been added to page cache 104. In some implementations, S1 can correspond to fictitious page 108 and S2 can correspond to fictitious page 114. For example, page 108 can be logically linked to memory object S1 and page 114 can be logically linked to S2.

In some implementations, the queue 102 can be used by a media application, such as iTunes® (available from Apple Inc., Cupertino, Calif.). In this example, a user of the iTunes application can request a song playlist for execution. The memory management system can request and retrieve memory object slots for the user-requested songs. The queue 102 can cache the requested media in the retrieved memory. For example, the queue 102 can cache memory object 106 (S1) as a first song and memory object 112 (S2) as a second song in the playlist. Each time a volatile memory object is added to the queue 102, a new fictitious page pointing to that memory object can be added to the page cache 104. For example, when memory object 106 is added to queue 102, fictitious page 108 can be added to the page cache 104. Similarly, when memory object 112 is added to queue 102, fictitious page 114 can be added to the page cache 104 and so on for each additional memory object (e.g., playlist song).

Continuing with the example above, suppose that in a media stream, a computer operating system recognizes that the oldest queued object is the most important, since it will generally be played soonest. Then suppose that the same system also recognizes that all four songs should be played in the user requested order. The system can begin playback of the playlist where S1 is the first song playing in iTunes. During playback of S1, a memory shortage can occur. In the event that a memory shortage occurs, the memory management system can purge one or more of the newer songs from the head of the queue 102. For example, the memory management system can purge any or all songs queued after S2 since they were added most recently. Before the purged songs reach playback status in iTunes, the memory management system can recreate any or all purged song entries. For example, when S2 is playing, other previously purged songs (not shown) can be recreated in queue 102 such that they are ready for playback at an opportune time.

A portion of the operating system (e.g., a memory management system) performing operations on the queues detailed in this disclosure can implement various algorithms. For example, one or more page replacement algorithms can be used to perform operations on any or all LIFO or FIFO queues. The page replacement algorithms can decide which memory pages to page out (swap out, write to disk) when a page of memory is to be allocated. Paging can generally happen when a page fault occurs and a free page can not be used to satisfy the allocation. For example, a free page may not be used to satisfy the allocation because none exist, or alternatively the number of free pages may be lower than some threshold.

In some implementations, the page replacement algorithm can analyze information about accesses to the pages provided by hardware, for example, and can attempt to guess which pages can be replaced to minimize the total number of page misses, while balancing this with the costs (e.g., cost of primary storage and processor time) of the algorithm itself.

Fictitious Pages

Fictitious pages can be used to couple queues to page caches. For example, fictitious page 108 can be used to couple queue 102 to page cache 104. In some implementations, a fictitious page can be represented by a token. For example, when the memory object 106 is added to the queue 102, a token (in the form of a fictitious page 108) can be added to the page cache 104. This token may not directly represent the object, but can be used to determine a movement speed of the page cache 104. In some implementations, the token can refer to a corresponding object queue (LIFO or FIFO). Eventually, the token 108 can reach the head of the page cache 104. At this point, the least important memory object from the corresponding queue (queue 102) can be purged. In some implementations, the memory object selected for purge may not necessarily be the memory object that was queued when the token was queued.

The memory management system can monitor the movement of fictitious pages (or tokens) through the page cache FIFO 104. The page cache FIFO 104 can be used to regulate the expiration of the purgeable virtual memory based on movement of the tokens. For example, a quick movement of the page cache can cause purgeable memory to be purged at a faster rate. The tokens can be used to correlate speed in both queues 102 and 104. In some implementations, an association may not exist between a token and purgeable memory object. Advantageously, tokens can enable LIFO queue behavior and/or eliminate unnecessary movement of purgeable pages through inactive queue.

Enabling LIFO Queue Behavior

Provision of the LIFO queue for memory objects can enable tokens in the page cache to move toward a place where they become "less important" (i.e., to the head of inactive queue, where they may be removed) while the purgeable memory objects move toward a place where they become "more important" (i.e., the longer they stay around, the closer they are to being needed by an application). Thus, a fixed association between token and object generally may not exist.

In general, tokens can be inserted either at the head or the tail of the page cache. Further, two categories can be realized for ordered purgeable memory objects: obsolete objects and valued objects. Obsolete objects can be reclaimed as soon as new pages are requested. Valued objects can be classified as least valued objects. The least valued object can be reclaimed if there are no obsolete objects and a token reaches the head of the queue 104, for example.

Token Usage

In some implementations, a list of tokens can be associated with one or more token counters. The count of a token counter is associated with a designation of a number of pages that have to be removed from a cache queue (e.g., a page cache queue) before the token is considered ready for removal. In operation, the token counter can be decremented (or incremented depending on the design) at the pace of pages (e.g., physical memory) being removed from the page cache 104. By implementing one or more token counters, the system can provide a tuneable parameter created from a ratio of inactive list size to initial token counter value, for example. Adding a new token each time a purgeable object is added can ensure that a particularly valuable page can be protected by this new token. Thus, the token counter can secure "valuable" object existence for another complete revolution of the inactive list. In some implementations, there exists one token queue per queue to ensure the system can determine which queue can empty objects. The token counter can assist the memory management system in regulating the expiration of purgeable virtual memory corresponding to tokens.

Page Queue Association of Purgeable Pages

In some implementations, pages of a purgeable memory object in its nonvolatile state can be treated similarly to those belonging to a regular object. As such, purgeable objects can be subject to a page out process.

Volatile "Obsolete" Queue

In some implementations, an obsolete queue can be a FIFO queue with the special property that its objects are emptied before objects from the other queues can be emptied, or any regular pages are reclaimed. An obsolete queue can be implemented in a similar fashion to the FIFO queue. For example, the obsolete queue token counter can be modified so that the tokens on it are considered "ripe." In some implementations, the system can query the obsolete queue first when looking for objects to empty, for example.

Figure 2:
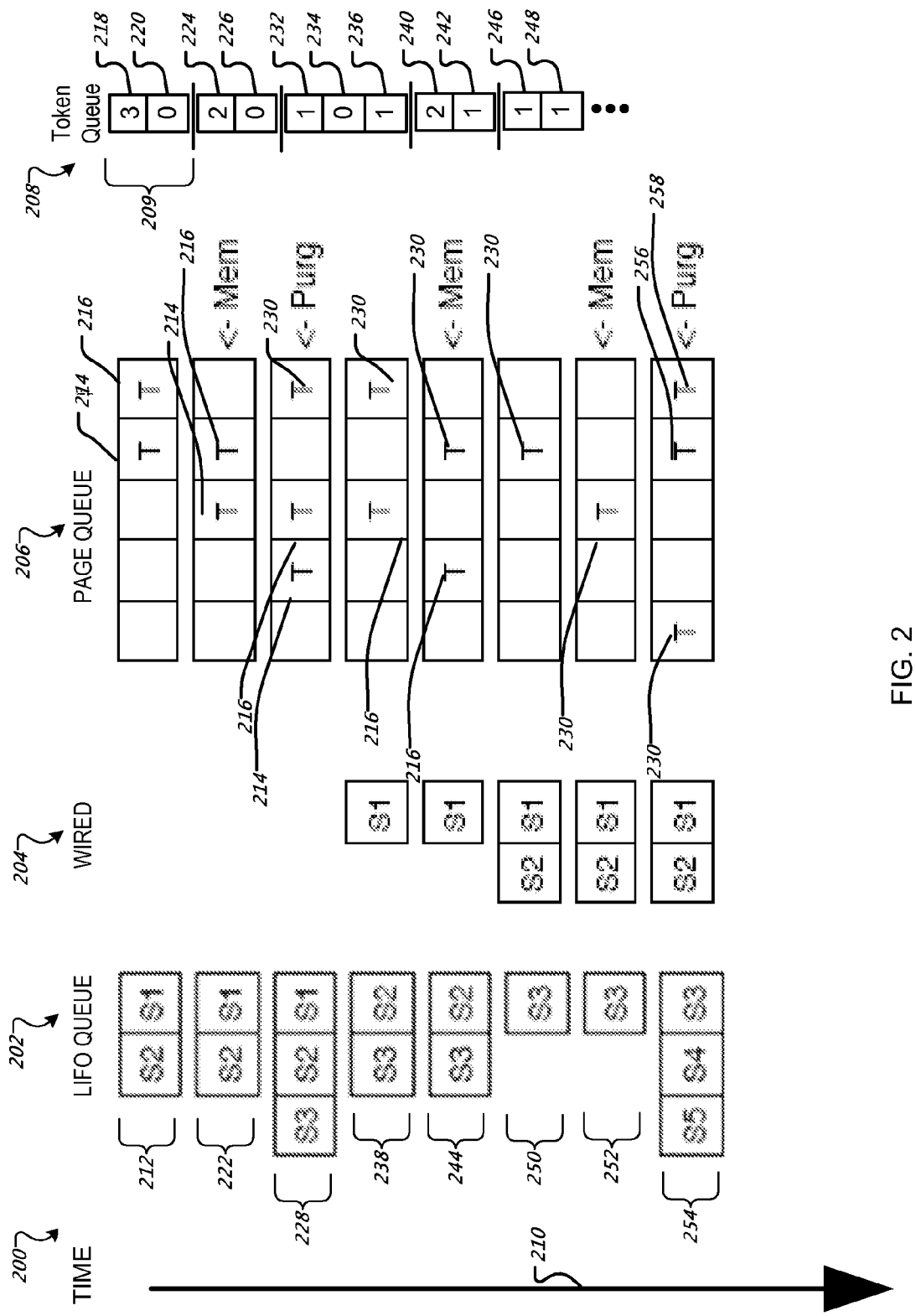
FIG. 2 is a flow diagram of an example process for managing purgeable memory objects.

Referring to FIG. 2, as an example, when an element is removed from the page queue 206, the token queue can be advanced one. Tokens that reach the head of the token queue 208 may not be immediately removed. Instead, they can be called "ripe", which can denote that a volatile object is ready to be emptied, for example Token Counters In some implementations, the tokens are implemented as counters. The token counters can be stored in a linked list. For example, the token counter can be implemented as a linked list of counter structs where element 0 can be reserved. The element 0 can be a zero index that denotes the end of the list. In some implementations, the linked list can be constructed to save space. For example, a fixed array of token counter structs can be implemented. In some implementations, each counter struct can include a 16-bit counter and a 16-bit index to the next list element.

In some implementations, the counter at the head of the list can designate how many pages can be removed from the inactive list before the token reaches its head. Thus, when the counter reaches 0, the token can be handled (e.g., an object is purged), and the counter can be removed from a token queue. The next counter can then begin to count down. In some implementations, tokens having the count of 0 can also stay around until memory is requested. Upon request, a purge of the token can be initiated in the page cache FIFO.

Example of the LIFO Queue and the Token Queue

FIG. 2 is a flow diagram of an example process 200 for managing purgeable memory objects. In some implementations, process 200 can be used to monitor movement of tokens through a memory cache. In particular, process 200 can insert tokens in a queue and determine whether a token has reached a predetermined position (e.g., the head) in the queue.

The illustrated flow diagram includes a LIFO queue 202, a wired state 204, a page queue 206, and a token queue 208. The LIFO queue 202 contains ordered media data objects (S1 through S5). The media data objects are indexed (e.g., S1, S2, S3, etc.) with numbers that generally denote the order the objects are entered into the queue 202 and the order with which they can be used. The process 200 can begin at the top and flow to the bottom over time, as indicated by arrow 210. The tokens (T) are generally moved from right to left where the left hand side of the queue is the head and the right hand side of the queue is the tail. The insertion of new memory pages can be notated as "Mem." Similarly, new tokens can be added on the right of the page queue 206 and notated as "Purg." Each time a new memory page is added to LIFO queue 202, a token (T) can be added to page queue 206.

In some implementations, each LIFO queue 202 can be represented by a structure that contains a pointer to an ordered list of volatile memory objects "vm_objects" and the token counters. In some implementations, a new field can be introduced to the vm_object_t type to create a linked list of vm_objects. Other implementations are possible. In some implementations, the LIFO queue 202 includes indexes to the token counter array for the head and the tail of the token counter list, as well as a pointer to the first unripe token. In some implementations, when the objects are used, pages can be removed from the page queue 206 and wired to wired state 204.

The term "wired" can indicate that a particular state for a page of memory in which it cannot be removed from physical memory (e.g., can not be purged or paged out). For example, the memory page can be wired and or fixed to a physical memory location such that another entity can not use the memory until it is released.

The token queue 208 can store token counts corresponding to memory objects in the LIFO queue 202. As shown, token queue 208 provides an array 209 that functions as a token counter. The array 209 can store the number of pages yet to be removed and the number of pages between tokens, among other counts. In particular, each token counter corresponding to a token in the token queue can designate how many pages have yet to be removed from a cache before the token reaches the head of the token queue 208. When a memory object is removed from the LIFO queue 202, the token queue can be advanced by one. In some implementations, tokens that reach the head of the token queue 208 can be readily emptied upon request.

As shown in FIG. 2, row 212 includes two purgeable memory objects S1 and S2 and their corresponding tokens 214 and 216. In addition, the token queue 208 for row 212 contains a '3' in box 218 indicating three pages have yet to be removed before token 214 reaches the head (in page queue 206). A '0' in box 220 can indicate that zero pages exist between the tokens 214 and 216.

The process 200 begins in row 222 by inserting a new purgeable memory object to the LIFO queue 202. For example, the page cache can add memory pages as they are requested by one or more applications. In general, the page cache can add memory pages as they are released for use by the system. Accordingly, the memory management system can shift the page queue 206 by one page. For example, the shift is shown in page queue 206 (in row 222) as tokens 214 and 216 are shifted one page to the left. In addition, the token queue 208 for row 222 can be updated with a '2' in box 224 indicating that two pages have yet to be removed before token 214 reaches the head (in page queue 206). A '0' in box 226 can indicate that zero pages exist between the tokens 214 and 216.

The process continues in row 228 with adding a memory object (S3) to the LIFO queue 202 (shown in row 228). The purgeable memory object S3 is shown to the left of page S2 to indicate that is next more important, for example. Accordingly, a new token 230 can be added to the tail of the page queue 206 (in row 228) if the purgeable object is valued. As shown, the purgeable memory object S3 is valued and the token 230 is added to the tail of page queue 206. In some implementations, the memory management system can determine a memory object is not valued, and can add the token head of the page queue 206. As shown, the page queue 206 in row 228 shifts to account for the new token 230. The token queue 208 can then be adjusted accordingly. For example, the token queue 208 can be updated with a '1" in box 232 indicating one page has yet to be removed before token 214 reaches the head; a '0' in box 234 indicating that zero pages exist between token 214 and 216; and a '1' in box 236 indicating that one page exists between token 216 and 230.

Process 200 continues in row 238 as a wiring of S1 is performed by the memory management system. As shown in row 238, the memory management system removed memory object S1 from the LIFO queue 202 and wired the memory object S1 to wired state 204. For example, the memory object S1 is made nonvolatile and may not be in a purgeable queue while being used. In some implementations, the memory object S1 can go in a purgeable FIFO queue (not shown) after the object is used. Next, in row 238 the memory management system removes the memory object S1 (214) from the page queue 206. The token queue 208 can then be adjusted, accordingly. For example, the token queue 208 can be updated with a "2" in box 240 indicating two pages have yet to be removed before token 216 reaches the head, and a '1' in box 242 indicating that one page exists between token 216 and 230.

Next, the process 200 continues into row 244. The LIFO queue 202 includes memory objects S3 and S2 and the wired state 204 includes memory object S1. The page queue 206 has been shifted left by one and the token queue 208 can be adjusted, accordingly. For example, the token queue 208 can be updated with a '1' in box 246 indicating that one page has yet to be removed before token 216 reaches the head, and a '1' in box 248 indicating that one page exists between token 216 and 230.

Process 200 continues in row 250 as the memory management system prepares to wire another memory object to wired state 204. For example, in row 250, the memory management system has removed page S2 from LIFO queue 202 and pushed the page onto the wired state 204. Since memory was removed from the LIFO queue 202, the previous token 216 in row 244 is shown removed from page queue 206 in row 250. The memory management system can then update the token queue 208 (not shown).

In row 252, no pages have been added or deleted, but the system requests that one or more memory pages be pushed to LIFO queue 202, as indicated by the "Mem" instruction in the page queue 206 (shown on row 252). As such, the page queue 206 can shift token 230 one page to the left and the instruction can be performed.

The LIFO queue in row 254 shows two new memory pages S4 and S5. The pages S4 and S5 were added when the memory management system performed the requested "Mem" operation from row 252. The addition of pages S4 and S5 can prompt the page queue 206 and token queue to update. As shown, page queue 206 on row 254 has shifted token 230 two spaces based on the addition of the two pages S4 and S5. In addition, two new tokens 256 (corresponding to S4) and 258 (corresponding to S5) have been added to the tail of the page queue in row 254.

As an example, suppose the memory management system requests memory at row 254. After receiving a memory request at row 254, the system can remove token 230 and purge or empty memory object S5.

Figure 3:
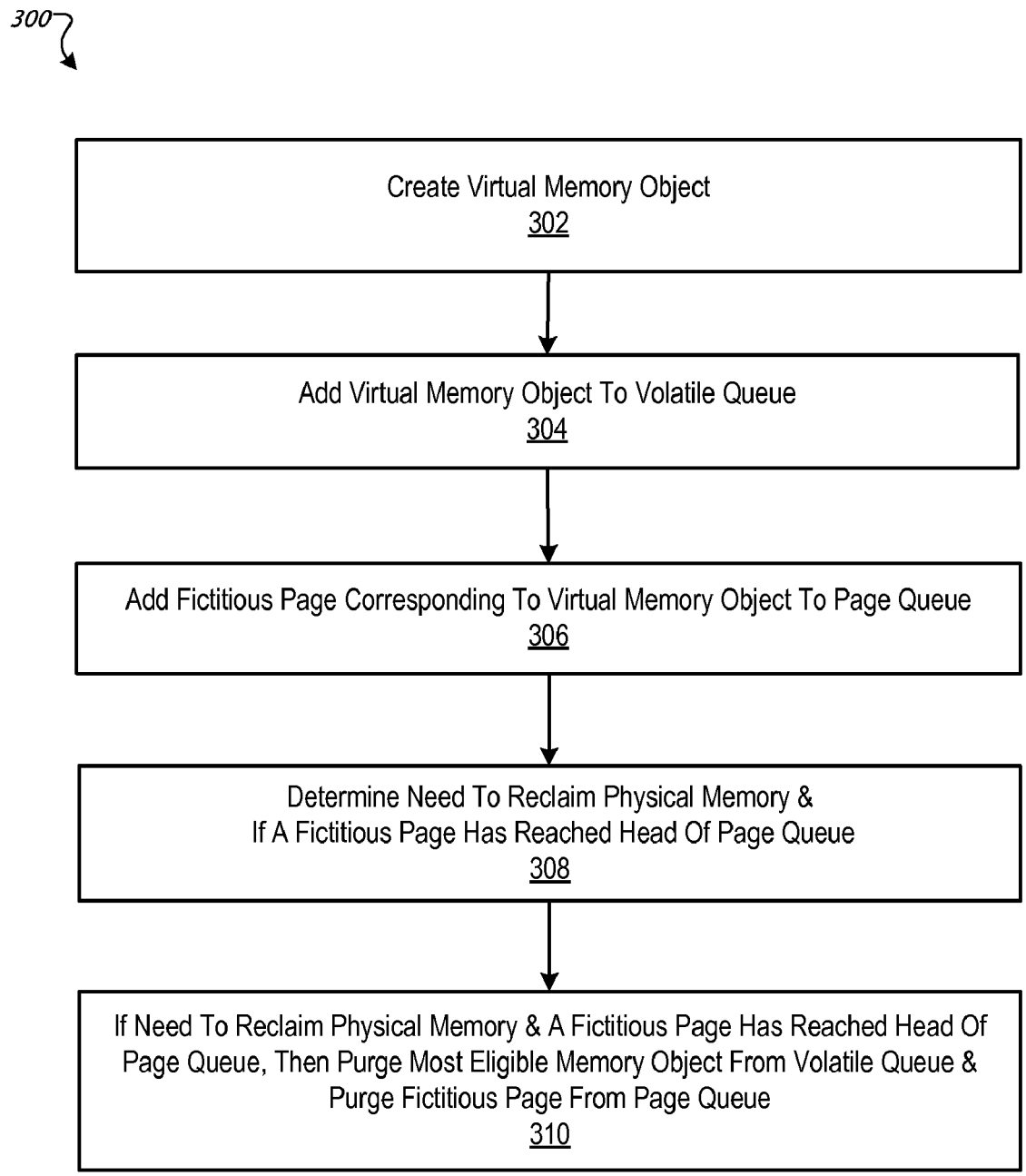
FIG. 3 is a flow diagram of an example process for managing fictitious pages used in the process of FIG. 2.

FIG. 3 is a flow diagram of an example process 300 for managing fictitious pages used in the process of FIG. 2. The token queue can be a LIFO or FIFO token queue. In the depicted example, the token queue can handle tokens as a LIFO queue. The process 300 begins when a virtual memory object is created (302). For example, the memory management system can create a virtual memory object (e.g., song in a play list) for a requesting application, such as iTunes.

The memory management system can add the virtual memory object to the volatile queue (304). For example, the memory management system can add the song or songs into a volatile LIFO queue. Upon adding the memory object to the volatile queue, the memory manager can add a fictitious page corresponding to the added virtual memory object to the page queue (306). For example, for each song added to the volatile LIFO queue, the memory manager can add a fictitious page in the page queue to represent each added song.

At some point, the memory management system can determine a need to reclaim physical memory and can determine if a fictitious page has reached the head of the page queue (308). As an example, the memory management system can determine which memory pages are wired to physical memory to determine which memory to reclaim.

If the memory management system determines that there is a need to reclaim physical memory and there is a fictitious page at the head of the page queue, the system can purge the eligible memory object from the volatile queue as well as purge its corresponding fictitious page from page queue (310). In the iTunes® playlist example, the memory management system can determine that more physical memory should be requested to fill the cache with user requested songs. In operation, the memory management system can be aware of the order of the entered memory pages (e.g., correlating to songs in the playlist). As such, songs entered most recently can be purged and recreated at a later time. Purging the memory can free the usable memory for playing the first or second listed song, for example.

Figure 4:
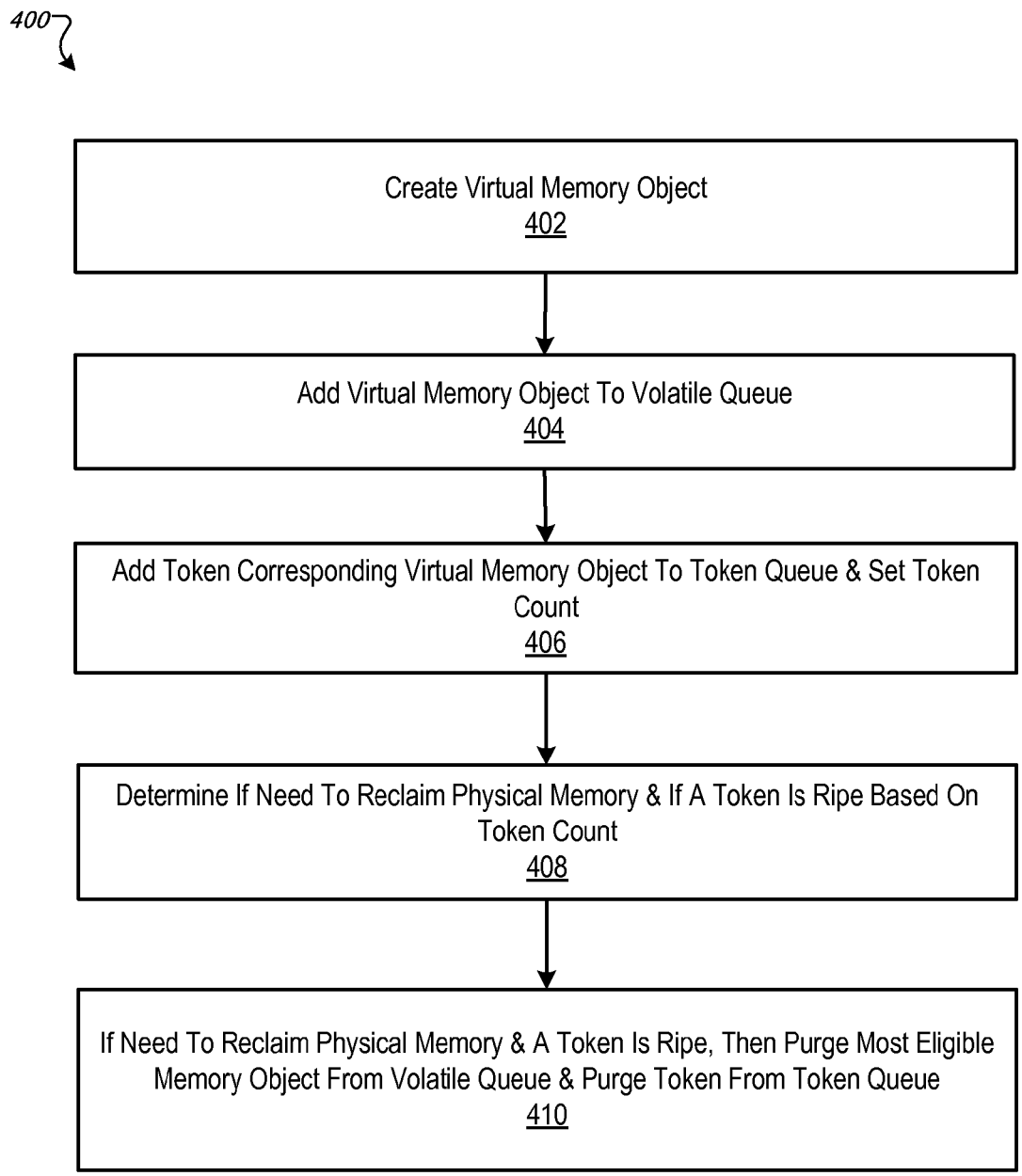
FIG. 4 is a flow diagram of an example process for managing a token queue used in the process of FIG. 2.

FIG. 4 is a flow diagram of an example process 400 for managing a token queue used in the process of FIG. 2. The process 400 begins when a virtual memory object is created (402). For example, a memory management system can create a virtual memory object for a requesting application.

The memory management system can add the virtual memory object to the volatile queue (404). Upon adding the memory object to the volatile queue, the memory management system can add a token to the token queue that corresponds to the virtual memory object. Further, the memory management system can set a token count based on the addition to the virtual memory object (406). For example, for each memory object added to the volatile queue, a token can be added to the token queue. Thus, the token queue counter can be increased by the number of tokens added. For example, when a new token is created, it is assigned a count indicating the number of pages inserted into the page cache since the last token was created. At this point, the sum of the token counts can generally equal the number of pages in the page cache, for example. Similarly, when a memory object is removed from the volatile queue, the token count can be decremented by the number of memory objects removed.

At some point, the memory management system can determine a need to reclaim physical memory and can further determine if a token is ripe based on the token count (408). In such a case, an eligible memory object can be purged from the volatile queue and the system can purge the ripe token from the token queue (410).

Figure 5:
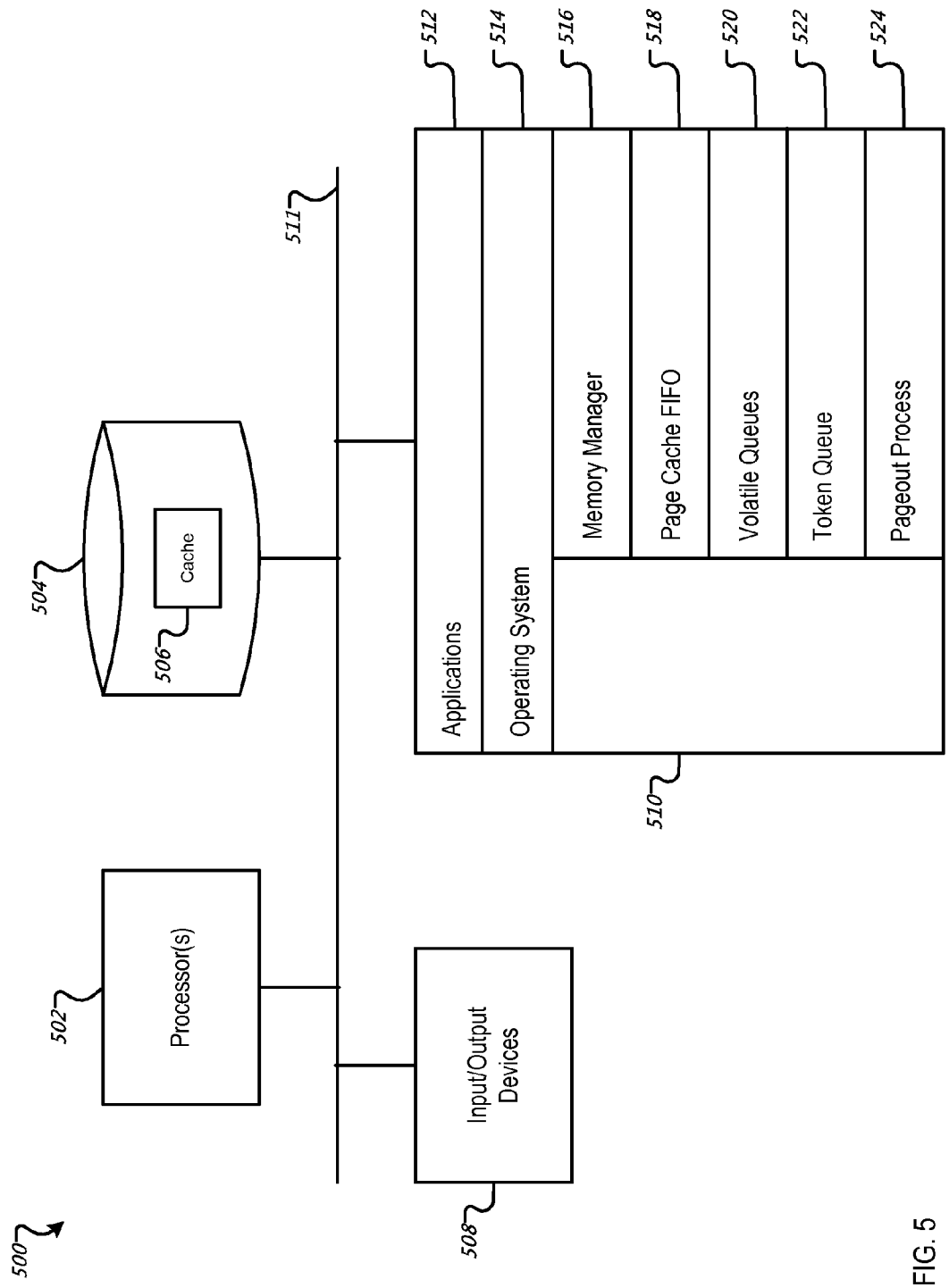
FIG. 5 is a block diagram of a system architecture for implementing the features described in reference to FIGS. 1-4.

FIG. 5 is a block diagram of a system architecture 500 for implementing the features described in reference to FIGS. 1-4. The architecture 500 can include a processor 502, a storage device 504, input/output devices 508, and a memory 510. Each of the components 502, 504, 508, and 510 are interconnected using a system bus 511. The processor 502 is capable of processing instructions for execution within the system 500. In one implementation, the processor 502 is a single-threaded processor. In another implementation, the processor 502 is a multi-threaded processor. The processor 502 is capable of processing instructions stored in the memory 510 or on the storage device 504 to display graphical information for a user interface on the input/output device 508.

The storage device 504 is capable of providing persistent storage for the system 500. The storage device 504 may be a floppy disk device, a hard disk device, an optical disk device, or a tape device, or other suitable persistent storage means. In some implementations, the storage device 504 can include a cache 506 used to store a page cache FIFO 518. In one implementation, cache 506 can be stored in wired kernel memory and accessed by the operating system. The input/output device 508 provides input/output operations for the system 500. In one implementation, the input/output device 508 includes a keyboard and/or pointing device. In another implementation, the input/output device 508 includes a display unit for displaying graphical user interfaces.

The memory 510 is a computer readable medium such as volatile or non volatile that stores information within the system 500. Memory 510 can include any memory or database module and may take the form of volatile or non-volatile memory including, without limitation, magnetic media, optical media, random access memory (RAM), read-only memory (ROM), removable media, or any other suitable local or remote memory component. Illustrated memory 510 can host applications 512 and one or more operating systems 514.

The operating system 514 can host and/or include a memory manager 516, the page cache FIFO 518, one or more volatile queues 520, one or more token queues 522, and a pageout process 524. Memory manager 516 is generally a portion of a computer program within operating system 514 which accepts requests from the application 512, for example, to allocate and de-allocate portions of memory. The memory manager can, for example, mirror a hard drive in virtual memory to increase the speed in which memory tasks are accomplished. In some implementations, the memory manager 516 can enable dynamic memory allocation. In some implementations, the memory manager 516 can provide optimized allocations and de-allocations, group allocated blocks according to particular conditions, and collect statistics for operating system 514 or application 512.

The page cache FIFO 518 can store memory pages. In some implementations, the memory pages stored in page cache FIFO 518 can be represented by fictitious memory pages. The fictitious memory pages can point to a memory object in volatile queue 520, for example. Thus, volatile queue 520 can be coupled to page cache FIFO 518.

The volatile queues 520 can generally include volatile purgeable memory objects. The memory manager 516 can move purgeable memory objects through the volatile queues 520. In some implementations, the volatile queues 520 can be FIFO queues. In other implementations, the volatile queues 520 can be LIFO queues. In yet another implementation, the volatile queues can include both FIFO and LIFO queues at the same time.

The token queues 522 can control the movement and or/or speed of the volatile queues 520. In some implementations, each volatile queue 520 owns a separate token queue 522 for purposes of controlling queue movement. In some implementations, for each item entered into a volatile queue 520, a token can be added to the corresponding token queue 522.

The pageout process 524 can be performed by a pageout daemon. The pageout process checks the token queues 522 when the system determines that more free more memory pages could be used in the system 500, for example. The pageout process 524 can reclaim or reactivate pages from the token queue 522. As such, the ripe token can be removed and an object from the associated volatile queue 520 can be emptied.

In some implementations, the pageout daemon may have the responsibility of decreasing the token counters. When the daemon requests free pages, it can check the token counters on each iteration. If there is a ripe token, a volatile object can purged. Upon purging, the pageout daemon can reevaluate the free page count. The reevaluation can ensure that the requested number of memory objects is emptied. As an example, the pageout process 524 can simply reactivate volatile pages. As such, volatile pages can be handled less frequently, for example.

Purge Groups

In some applications that receive data (e.g., media applications), data can sometimes arrive out of order. For example, new pages of media data (e.g., video) downloaded from a web property (e.g., YouTube®) or loaded from a disk may need to be consumed by an application in a different order then the data is received by the application. The memory management system may need to allocate more memory for the received data then is currently available. Under such circumstances, memory objects can be purged and reclaimed for use with the application, as previously described in reference to FIGS. 1-5. It is desirable, however, that the memory objects that are purged and reclaimed have the least value to the application. For example, in a music player scenario where the user is playing through a playlist, memory objects allocated with a currently playing song and/or the next song in the playlist may have a greater value then memory objects allocated for a song at the bottom of the list. Thus it is desirable, in certain applications, to manage purgeable memory objects at the application level by dividing files into blocks, assigning values to the blocks and labeling or marking the blocks according to their values. The labels can be used to determine a purge order (e.g., purge in reverse value order) for memory objects, as described more fully with reference to FIG. 6.

Figure 6:
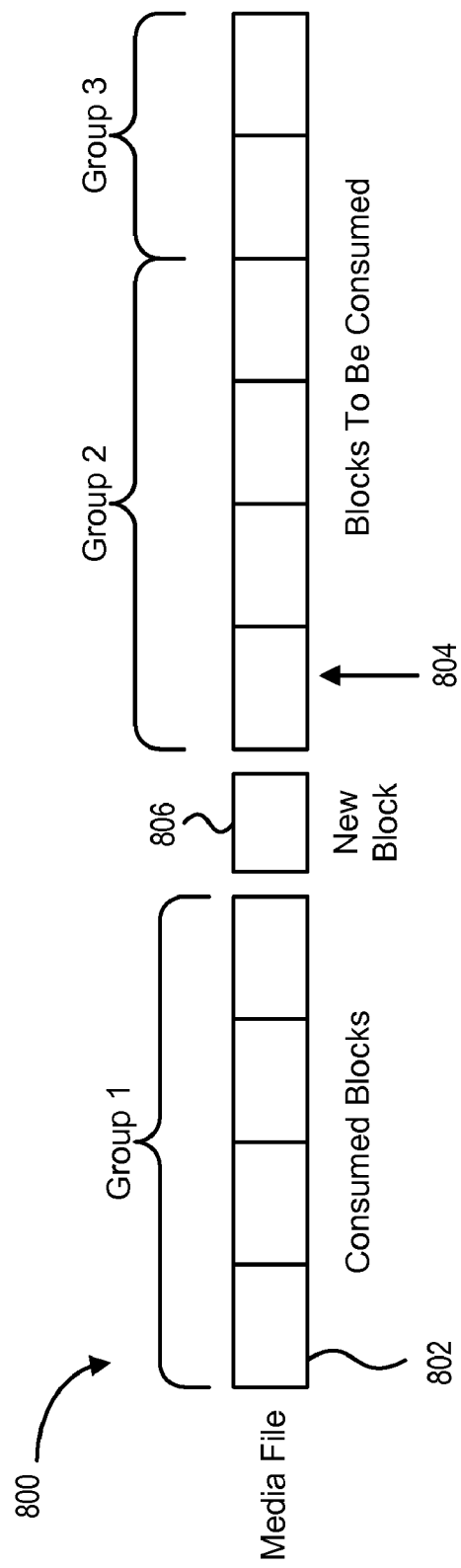
FIG. 6 is a block diagram conceptually illustrating the insertion of a data block into a purge group.

FIG. 6 is a block diagram conceptually illustrating the insertion of a data block into a purge group. FIG. 6 model a play head 804 moving through a media file (e.g., an audio file). In the example shown, a group of data blocks 802 have been assigned to different purge groups: Group 1, Group 2 and Group 3. While only three purge groups are shown in this example, any number of purge groups and subgroups can be used depending on the application.

Group 1 includes blocks 802 that have already been consumed. Group 2 includes data blocks 802 that are about to be consumed and Group 3 includes data blocks 802 that are last to be consumed. One possible purge order is to purge Group 3 before Group 2, since the Group 2 data blocks 802 are about to be consumed by the application (e.g., a media player), and thus have a higher value then the data blocks 802 assigned to Group 3. This purge order is referred to as reverse value order. Memory objects allocated to data blocks in Group 3 are purged before memory objects allocated to data blocks in Group 2.

Note that an advantage of this memory management scheme is that the purge order is controlled at the application level through the use of purge groups. Accordingly, an application developer can decide how best to reclaim memory objects to improve performance using purge groups, then make calls to a memory management system, which performs the actual purging, such as described in referent to FIGS. 1-5.

In some implementations, data blocks that arrive out of order can be assigned to purge groups. In the example, shown a new block 806 is inserted into Group 2 based on its value (e.g., when it will be consumed). In some implementations, a purge group is a queue data structure with head and tail pointers defining the ends of the queue, respectively. The new block 806 can be added to Group 2 by adding the new block 806 to the head of the queue (e.g., a LIFO queue) and adjusting one of the pointers to increase the size of the queue. The new block 806 can be added at any desired position in the queue and not necessarily at the head or tail. In some implementations, the addition of the new block 806 will result in data blocks being reassigned to other purge groups. This could occur, for example, where the size of the purge groups are fixed.

Figure 7:
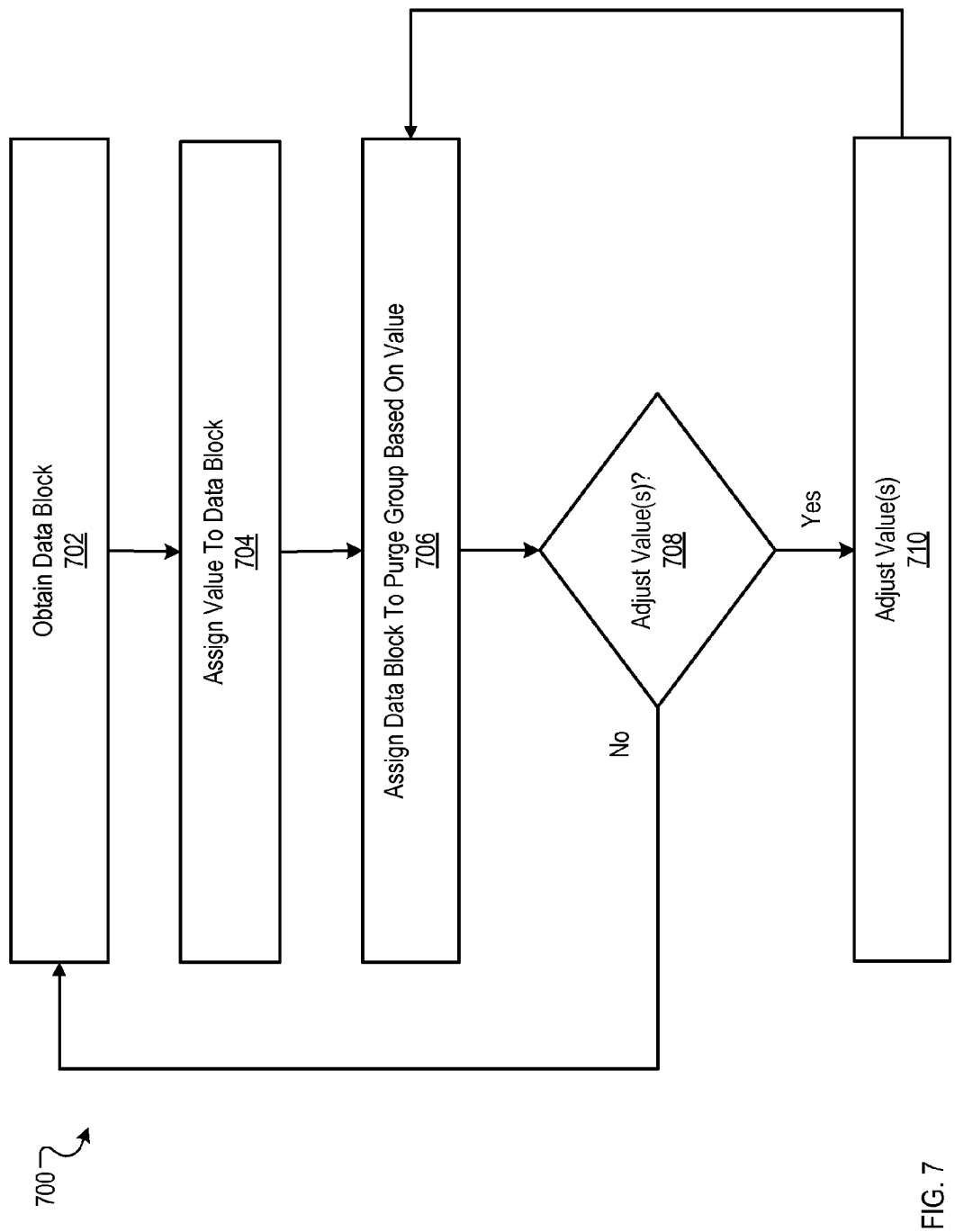
FIG. 7 is a flow diagram of a process for managing memory object purge order using purge group.

FIG. 7 is a flow diagram of a process 700 for managing memory object purge order using purge groups. In some implementations, the process 700 begins when data blocks are obtained (702). In some applications, portions of a file (e.g., a media file) may be obtained by an application (e.g., a media player). For example, a media file (e.g., an audio or video file) can be divided in data blocks which can be ordered for playback by a media player application (e.g., iTunes®).

The data blocks are assigned values (704) according to a value scheme. For example, data blocks can be assigned values based on when the data blocks are likely to be consumed by the application. Data blocks that are likely to be consumed first will have higher values than data blocks that will likely be consumed last.

The data blocks are assigned to purge groups based on their values (706). For example, a number of groups can be created for data blocks. The order in which a given memory object allocated to a given data block is purged will depend on the purge group to which the data block is assigned. Thus the purge groups define a purge order for purgeable memory objects. Moreover, data blocks in each group can be ordered, so that for a given purge group the data blocks within the purge group are purged based on their respective positions within the purge group. Any number of purge groups can be created. New data blocks can be added at any desired position in a given purge group. In some implementations, purge groups can be queue data structures with head and tail pointers.

If new data blocks are received out of order or if a memory allocation scheme otherwise changes, then one or more values for the data blocks can be adjusted If data block values are to be adjusted (708), the values are adjusted (710) and the process 700 returns to step 706, so that the data blocks (now having new values) can be assigned to new (or the same) purge groups. If data block values are not adjusted (708), then the process 700 can return to step 702 to wait for new data blocks to arrive. In some implementations, new purge groups or subgroups can be created in realtime to accommodate data blocks arriving to an application out of order (e.g., out of normal consumption order).

In some implementations, data block values may be adjusted based on observations of a purgeable memory object associated with a test data block. The test data block can be assigned to a lowest value position in a lowest value purge group to measure the "pressure" on the memory management system to allocate memory. The memory object associated with the test block can be stored in a volatile queue (e.g., volatile queue 520). If the memory object is immediately purged, then the process 700 observes that the memory allocation pressure is high, and the process 700 can assign new values to data blocks and/or create new purge groups or subgroups based on this observation.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining a first data block and a second data block, wherein the first data block will be consumed by an application before the second data block is consumed by the application;
   assigning a first value to the first data block and a second value to the second data block, wherein the first value and the second value correspond to the order in which the first data block and the second data block will be consumed by the application;
   assigning the first data block to a first purge group based on the first value;
   assigning the second data block to a second purge group based on the second value; and
   establishing a memory object purge order based on the first purge group and the second purge group, wherein data blocks in the second purge group are purged before data blocks in the first purge group.

2. The method of claim 1, further comprising:
   determining if the first value for the first data block is to be adjusted; and
   adjusting the first value to a third value; and
   assigning the first data block to the second purge group based on the third value.

3. The method of claim 2, where adjusting the first value further comprises:
   determining a pressure on a memory management system to allocate memory; and
   adjusting the first value based on the determination.

4. The method of claim 3, where determining pressure on a memory management system, further comprises:
   creating a test data block;
   assigning the test data block to a lowest value position in a lowest value purge group; and
   observing whether a memory object associated with the test data block is purged from a volatile queue.

5. The method of claim 1, where the first data block is obtained by dividing a media file into a number of data blocks.

6. The method of claim 1, where assigning the first data block to a first purge group, further comprises:
   inserting the first data block in a queue data structure associated with the first purge group.

7. The method of claim 2, where determining if the first value for the first data block is to be adjusted to a third value further comprises:
   obtaining a third data block;
   assigning a fourth value to the third data block; and
   determining if the first value for the first data block is to be adjusted to the third value based on the fourth value assigned to the third data block.

8. A non-transitory computer-readable medium including one or more sequences of instructions which, when executed by one or more processors, causes:
   obtaining a first data block and a second data block, wherein the first data block will be consumed by an application before the second data block is consumed by the application;
   assigning a first value to the first data block and a second value to the second data block, wherein the first value and the second value correspond to the order in which the first data block and the second data block will be consumed by the application;
   assigning the first data block to a first purge group based on the first value;
   assigning the second data block to a second purge group based on the second value; and
   establishing a memory object purge order based on the first purge group and the second purge group, wherein data blocks in the second purge group are purged before data blocks in the first purge group.

9. The non-transitory computer-readable medium of claim 8, wherein the instructions cause:
   determining if the first value for the first data block is to be adjusted; and
   adjusting the first value to a third value; and
   assigning the first data block to a second purge group based on the third value.

10. The non-transitory computer-readable medium of claim 9, where the instructions that cause adjusting the first value include instructions that cause:
    determining a pressure on a memory management system to allocate memory; and
    adjusting the first value based on the determination.

11. The non-transitory computer-readable medium of claim 10, where the instructions that cause determining pressure on a memory management system include instructions that cause:
    creating a test data block;
    assigning the test data block to a lowest value position in a lowest value purge group; and
    observing whether a memory object associated with the test data block is purged from a volatile queue.

12. The non-transitory computer-readable medium of claim 8, where the first data block is obtained by dividing a media file into a number of data blocks.

13. The non-transitory computer-readable medium of claim 8, where the instructions that cause assigning the first data block to a first purge group include instructions that cause:
    inserting the first data block in a queue data structure associated with the first purge group.

14. The non-transitory computer-readable medium of claim 9, where the instructions that cause determining if the first value for the first data block is to be adjusted to a the third value include instructions that cause:
    obtaining a third data block;
    assigning a fourth value to the third data block; and
    determining if the first value for the first data block is to be adjusted to the third value based on the fourth value assigned to the third data block.

15. A system comprising:
    one or more processors; and
    a computer-readable medium including one or more sequences of instructions which, when executed by the one or more processors, causes:
    obtaining a first data block and a second data block, wherein the first data block will be consumed by an application before the second data block is consumed by the application;
    assigning a first value to the first data block and a second value to the second data block, wherein the first value and the second value correspond to the order in which the first data block and the second data block will be consumed by the application;
    assigning the first data block to a first purge group based on the first value;
    assigning the second data block to a second purge group based on the second value; and
    establishing a memory object purge order based on the first purge group and the second purge group, wherein data blocks in the second purge group are purged before data blocks in the first purge group.

16. The system of claim 15, wherein the instructions cause:
    determining if the first value for the first data block is to be adjusted; and
    adjusting the first value to a third value; and
    assigning the first data block to a second purge group based on the third value.

17. The system of claim 16, where the instructions that cause adjusting the first value include instructions that cause:
    determining a pressure on a memory management system to allocate memory; and
    adjusting the first value based on the determination.

18. The system of claim 17, where the instructions that cause determining pressure on a memory management system include instructions that cause:
    creating a test data block;
    assigning the test data block to a lowest value position in a lowest value purge group; and observing whether a memory object associated with the test data block is purged from a volatile queue.

19. The system of claim 15, where the first data block is obtained by dividing a media file into a number of data blocks.

20. The system of claim 15, where the instructions that cause assigning the first data block to a first purge group include instructions that cause:

inserting the first data block in a queue data structure associated with the first purge group.

21. The system of claim 16, where the instructions that cause determining if the first value for the first data block is to be adjusted to a second value include instructions that cause:

obtaining a third data block;

assigning a fourth value to the third data block; and determining if the first value for the first data block is to be adjusted to the third value based on the fourth value assigned to the third data block.

* * * * *

UNITED STATES PATENT AND TRADEMARK OFFICE
CERTIFICATE OF CORRECTION

PATENT NO. : 8,380,948 B2  
APPLICATION NO. : 12/204775  
DATED : February 19, 2013  
INVENTOR(S) : Heiko Gernot Albert Panther et al.

Page 1 of 1

It is certified that error appears in the above-identified patent and that said Letters Patent is hereby corrected as shown below:

In the Claims:

In Claim 14, column 16, line 22, delete "a the" and insert -- the --.

Signed and Sealed this  
Twenty-first Day of May, 2013

Teresa Stanek Rea  
*Acting Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,380,948 B2 | |
| APPLICATION NO. | : 12/204775 | |
| DATED | : February 19, 2013 | |
| INVENTOR(S) | : Panther et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this
Twenty-third Day of December, 2014

Michelle K. Lee
*Deputy Director of the United States Patent and Trademark Office*